No. 745,211. PATENTED NOV. 24, 1903.
N. J. MARTIN.
WARP BEAM FOR LOOMS.
APPLICATION FILED AUG. 9, 1902.
NO MODEL.
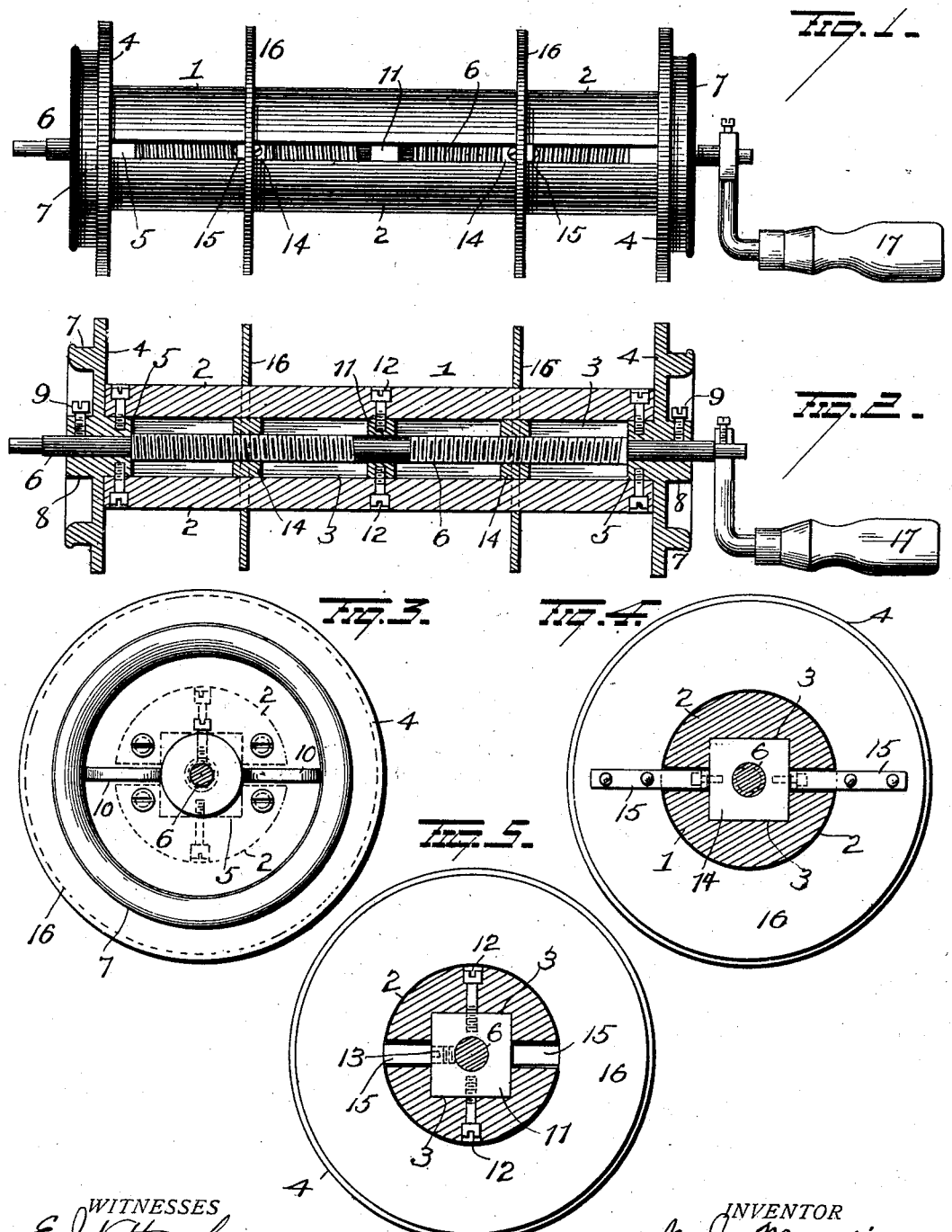

No. 745,211. Patented November 24, 1903.

UNITED STATES PATENT OFFICE.

NICHOLAS J. MARTIN, OF TAUNTON, MASSACHUSETTS.

WARP-BEAM FOR LOOMS.

SPECIFICATION forming part of Letters Patent No. 745,211, dated November 24, 1903.

Application filed August 9, 1902. Serial No. 119,035. (No model.)

*To all whom it may concern:*

Be it known that I, NICHOLAS J. MARTIN, of Taunton, in the county of Bristol and State of Massachusetts, have invented certain new and useful Improvements in Warp-Beams for Looms; and I do hereby declare the following to be a full, clear, and exact description of the invention, such as will enable others skilled in the art to which it appertains to make and use the same.

My invention relates to an improvement in warp-beams for looms; and it consists in the parts and combinations of parts, as will be more fully described, and pointed out in the claims.

In the accompanying drawings, Figure 1 is a view in elevation of my improved beam. Fig. 2 is a view in longitudinal section of same. Fig. 3 is a view in end elevation showing the shaft in section, and Figs. 4 and 5 are views in transverse section.

1 represents the beam, preferably made of wood. This beam is made in two semicylindrical sections separated, as shown, to leave a space between them for the passage of the movable head-carrying arms, which will be hereinafter described. Each section 2 of the beam 1 is cut away at its inner central face, as shown at 3, the two cut-away portions forming a rectangular chamber extending throughout the length of the beam, within which the nuts which actuate the movable heads rest and move.

4 represents the end heads, preferably made of metal and connected by screws or otherwise permanently connected to the two sections 2 of the beam 1, thus firmly connecting and supporting the two sections of the beam and holding them in their proper relative positions. Each head 4 is provided with an inwardly-projecting angular boss 5, which latter is shaped to fit within the cut-away portion 3 of the beam 1, and operate as spacing-blocks for the two sections of the latter, and also form end abutments for the screw-shaft 6, extending through the beam. Each end head 4 is provided on its outer face with a friction-flange 7 and with an outwardly-projecting hub 8, carrying a set-screw 9, which latter is employed for locking the screw-shaft 6 against rotation, and the friction-flanges are supported and strengthened by the ribs 10, extending from said flanges to the hubs 8.

The screw-shaft 6 extends lengthwise through the chamber in the beam 1 and is provided with right and left hand threads, the latter being separated by a central smooth section, the extreme ends of the screw being also smooth and operating as journals upon which the beam rotates. The outer ends of the threaded sections of the screw 6 bear against the bosses 5 of the end heads 4, which prevent any longitudinal movement of the screw-shaft, and the latter is also supported centrally by the fixed metal bearing 11, located centrally within the beam 1. This metal bearing fits within the recess or cut-away portion 3 of the beam and is secured in place by the screws 12 and carries a set-screw 13, which latter may be employed for assisting in locking the screw-shaft 6 against rotation.

Mounted on each threaded section of the screw-shaft 6 is a nut 14. These nuts are angular to conform to the shape of the recess or cut-away portion 3 in the beam, but are so constructed as to move freely therein when the screw-shaft 6 is rotated. Each nut 14 is provided with two oppositely-disposed arms 15, which latter project through the spaces between the sections 2 of beam 1 and carry at their outer ends the movable heads 16. These heads 16 are made of metal and constructed to closely embrace the beam 1 and are rigidly secured to the arms, so that there will be no movement whatsoever of the heads on the beam except the movement imparted thereto by the rotation of the screw-shaft 6. The heads 16 are of less diameter than the heads 4, so that when the beam is removed from the slasher and laid on the floor the yarn wound thereon will be held out of contact with the floor, the outer heads acting as wheels on which the beam may be rolled from place to place.

The shaft 6, as before stated, forms journals on which the beam is supported in the loom and is also provided with a handle 17, by which the screw-shaft 6 may be rotated. By rotating the screw-shaft 6 the movable heads 16 will be simultaneously and regularly moved toward or away from each other, and after having been properly placed they may be locked by the set-screws 9 and 13.

It is evident that many slight changes might be made in the relative arrangement of parts herein shown and described without departing from the spirit and scope of my invention. Hence I would have it understood that I do not wish to confine myself to the exact construction and arrangement of parts herein shown and described; but, Having fully described my invention, what I claim as new, and desire to secure by Letters Patent, is—

1. The combination with a beam comprising two semicircular wooden sections spaced apart, each section having a groove in its inner face, of end heads secured to said sections and spacing them apart, a right and left hand screw-shaft passing through the beam and mounted in said end heads, movable heads mounted on the beam, nuts in the beam through which said screw-shaft passes and arms connecting said nuts with the movable heads.

2. The combination with a slotted beam having a central recess and two fixed heads, each of said fixed heads having a smooth periphery, of a right and left hand screw within said recess and passing through the heads, movable heads located intermediate the fixed heads and of less diameter than the fixed heads, and means connecting the movable heads and screw.

3. The combination with a two-part beam, each part having a central angular groove, the two grooves forming an elongated angular recess or chamber, of two end heads, each having an angular boss closing one end of said recess or chamber and holding the two parts of the beam spaced apart, a screw-shaft having right and left hand threads and passing longitudinally through said beam and heads, intermediate heads embracing the beam between the fixed heads and means connecting the intermediate heads and screw-threaded section of the shaft.

4. The combination with a slotted beam having a central longitudinal recess therein angular in cross-section and end heads rigidly secured to the ends of said beam, of a bearing located centrally within the recess in the beam, a right and left hand screw-shaft passing through the beam and heads and supported in the central bearing and heads, angular nuts engaging the threaded sections of the shaft and located on opposite sides of the central bearing, adjustable heads embracing the beam, means connecting the nuts and adjustable heads and set-screws for locking the shaft against rotation.

In testimony whereof I have signed this specification in the presence of two subscribing witnesses.

NICHOLAS J. MARTIN.

Witnesses:
ROBERT COCHRANE,
W. J. DAVISON.